United States Patent
Vande Sande et al.

(10) Patent No.: US 12,472,994 B2
(45) Date of Patent: Nov. 18, 2025

(54) HOPPER CAR DISCHARGE GATE SEAL ASSEMBLY

(71) Applicant: Trinity Rail Group, LLC, Dallas, TX (US)

(72) Inventors: Jerry W. Vande Sande, Dallas, TX (US); Carter Ray Andrews, Dallas, TX (US); Brant R. McGhee, Arlington, TX (US); Andrew Brown, Plano, TX (US); Kenneth W. Huck, Fairview, TX (US)

(73) Assignee: Trinity Rail Group, LLC, Dallas, TX (US)

( * ) Notice: Subject to any disclaimer, the term of this patent is extended or adjusted under 35 U.S.C. 154(b) by 801 days.

(21) Appl. No.: 17/747,018

(22) Filed: May 18, 2022

(65) Prior Publication Data

US 2022/0371629 A1 Nov. 24, 2022

Related U.S. Application Data

(60) Provisional application No. 63/190,879, filed on May 20, 2021.

(51) Int. Cl.
*B61D 7/22* (2006.01)
*B61D 7/02* (2006.01)

(52) U.S. Cl.
CPC ........ *B61D 7/22* (2013.01); *B61D 7/02* (2013.01)

(58) Field of Classification Search
CPC .................................... B61D 7/02; B61D 7/22
See application file for complete search history.

(56) References Cited

U.S. PATENT DOCUMENTS

| | | | | |
|---|---|---|---|---|
| 3,596,611 A | * | 8/1971 | Floehr | B61D 7/22 |
| | | | | 105/295 |
| 3,683,820 A | * | 8/1972 | Floehr | B61D 7/20 |
| | | | | 105/310.1 |

(Continued)

FOREIGN PATENT DOCUMENTS

| | | | | |
|---|---|---|---|---|
| CA | 1323052 C | * | 10/1993 | B61D 7/22 |
| CA | 2988328 A1 | * | 7/2018 | B61D 7/02 |

(Continued)

OTHER PUBLICATIONS

PCT Notification of Transmittal of the International Search Report and the Written Opinion of the International Searching Authority, or the Declaration, re PCT/US2022/029905, mailed Jul. 14, 2022.

(Continued)

*Primary Examiner* — Jason C Smith
(74) *Attorney, Agent, or Firm* — Baker Botts L.L.P.

(57) ABSTRACT

A railcar comprises a hopper coupled to a discharge assembly. The discharge assembly comprises a discharge gate, a sloped side sheet, a gasket bracket, and a seal gasket. The sloped side sheet longitudinally extends above the discharge gate when the discharge gate is closed. The gasket bracket coupled to the sloped side sheet. The gasket bracket extends longitudinally along a bottom end of the sloped side sheet. The seal gasket is positioned between the sloped side sheet and the gasket bracket. The seal gasket has a straight section and a rounded section, such that a portion of the round section of the seal gasket is left beyond the bottom end of the sloped side sheet. The seal gasket creates a seal between the sloped side sheet and the discharge gate such that the weight of a lading increases the seal.

20 Claims, 7 Drawing Sheets

(56) References Cited

U.S. PATENT DOCUMENTS

| | | | | |
|---|---|---|---|---|
| 3,807,318 | A | * 4/1974 | Chierici | B61D 7/22 |
| | | | | 105/282.2 |
| 6,044,771 | A | * 4/2000 | Nguyen | B61D 7/00 |
| | | | | 105/247 |
| 2017/0267259 | A1* | 9/2017 | Ozerdim | E06B 7/22 |
| 2022/0371629 | A1* | 11/2022 | Vande Sande | B61D 7/22 |

FOREIGN PATENT DOCUMENTS

| | | | | |
|---|---|---|---|---|
| CA | 3060326 A1 | * 12/2018 | | B61D 7/02 |
| WO | WO-2022245995 A1 | * 11/2022 | | B61D 7/02 |

OTHER PUBLICATIONS

PCT Notification Concerning Transmittal of International Preliminary Report on Patentability (Chapter 1 of the Patent Cooperation Treaty), mailed Nov. 30, 2023, re PCT/US2022/029905.

PCT International Preliminary Report on Patentability (Chapter 1 of the Patent Cooperation Treaty), re PCT/US2022/029905 dated Nov. 21, 2023.

* cited by examiner

HOPPER CAR DISCHARGE GATE SEAL ASSEMBLY

RELATED APPLICATION AND CLAIM TO PRIORITY

This application claims priority to U.S. Provisional Application No. 63/190,879 filed May 20, 2021 and titled "HOPPER CAR DISCHARGE GATE SEAL ASSEMBLY," which is incorporated herein by reference.

TECHNICAL FIELD

This disclosure relates generally to railcars and, more particularly, to a hopper car discharge gate seal assembly.

BACKGROUND

Railway hopper cars transport and sometimes store bulk materials. Hopper cars generally include one or more hoppers which may hold cargo or lading during shipment. Hopper cars are frequently used to transport coal, sand, metal ores, aggregates, grain and any other type of lading which may be satisfactorily discharged through openings formed in one or more hoppers. Discharge gates are typically provided at or near the bottom of each hopper to rapidly discharge cargo. A variety of door assemblies or gate assemblies along with various operating mechanisms have been used to open and close discharge openings associated with railway hopper cars.

The discharge gates usually require a seal assembly to prevent loss of cargo during transport or prevent entry of unwanted materials from outside of the hopper, such as water or dust. Depending upon the cargo being transported, various levels of performance may be required from the seal between the gate and the hopper structure. In addition, the seal assembly is required to provide a seal under various environmental conditions, including icing, dust, etc.

SUMMARY

To address the foregoing problems, systems and methods are disclosed herein for providing a discharge gate seal assembly for hopper cars. Railcars that carry commodities that are discharged from the bottom of the railcar typically use a slide gate mechanism to open discharge gates that permit the commodity to flow out of the railcar using gravity. The discharge gates may be opened manually or with the aid of externally applied mechanical tools. Conventionally, the commodity is dropped from a horizontal sliding discharge gate. For example, a railcar discharge gate mounting frame may be arranged along a horizontal plane and the slide discharge gates operate in a horizontal direction along the longitudinal axis of the railcar.

This disclosure contemplates an unconventional discharge gate seal assembly for hopper cars that provides a seal to the discharge gate so that the commodity remains in the hopper and prevents the entry of unwanted particles and materials, such as dust or water from outside the hopper.

For example, particular embodiments comprise a seal assembly that is coupled to the above surface of a sloped side sheet (or a sloped hopper sheet) that guides the commodity toward a discharge gate. Particular embodiments comprise a seal assembly that is coupled to the underneath surface of a sloped side sheet. Particular embodiments comprise a seal assembly that is coupled to the above surface of a sloped side sheet. Particular embodiments comprise a first seal assembly that is coupled to the above surface of a sloped side sheet, and a second seal assembly that is coupled to the underneath surface of the sloped side sheet. As such, the present disclosure provides a solution to improve the current hopper car discharge gate seal designs.

Several embodiments are elaborated on in this disclosure. In accordance with a particular embodiment, a railcar comprises a hopper and a discharge assembly. The discharge assembly is coupled to the hopper. The discharge assembly comprises a discharge gate, a first sloped side sheet, a first gasket bracket, and a first gasket seal. The discharge gate is operable to move from a closed position that restricts a lading from discharging through the discharge gate to an open position that permits the lading to discharge through the discharge gate. The first sloped side sheet is longitudinally extended above the discharge gate when the discharge gate is closed. The first gasket bracket is coupled to the first sloped side sheet. The first gasket bracket extends longitudinally along a bottom end of the first sloped side sheet. The first seal gasket is positioned between the first sloped side sheet and the first gasket bracket, where the first seal gasket has a straight section and a rounded section. The first gasket bracket is mounted on top of the first sloped side sheet. The first seal gasket is positioned above the first sloped side sheet and underneath the first gasket bracket, such that a portion of the rounded section of the first seal gasket is left beyond the bottom end of the first sloped side sheet. The first seal gasket creates a seal between the first sloped side sheet and the discharge gate such that the weight of the lading increases the seal.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
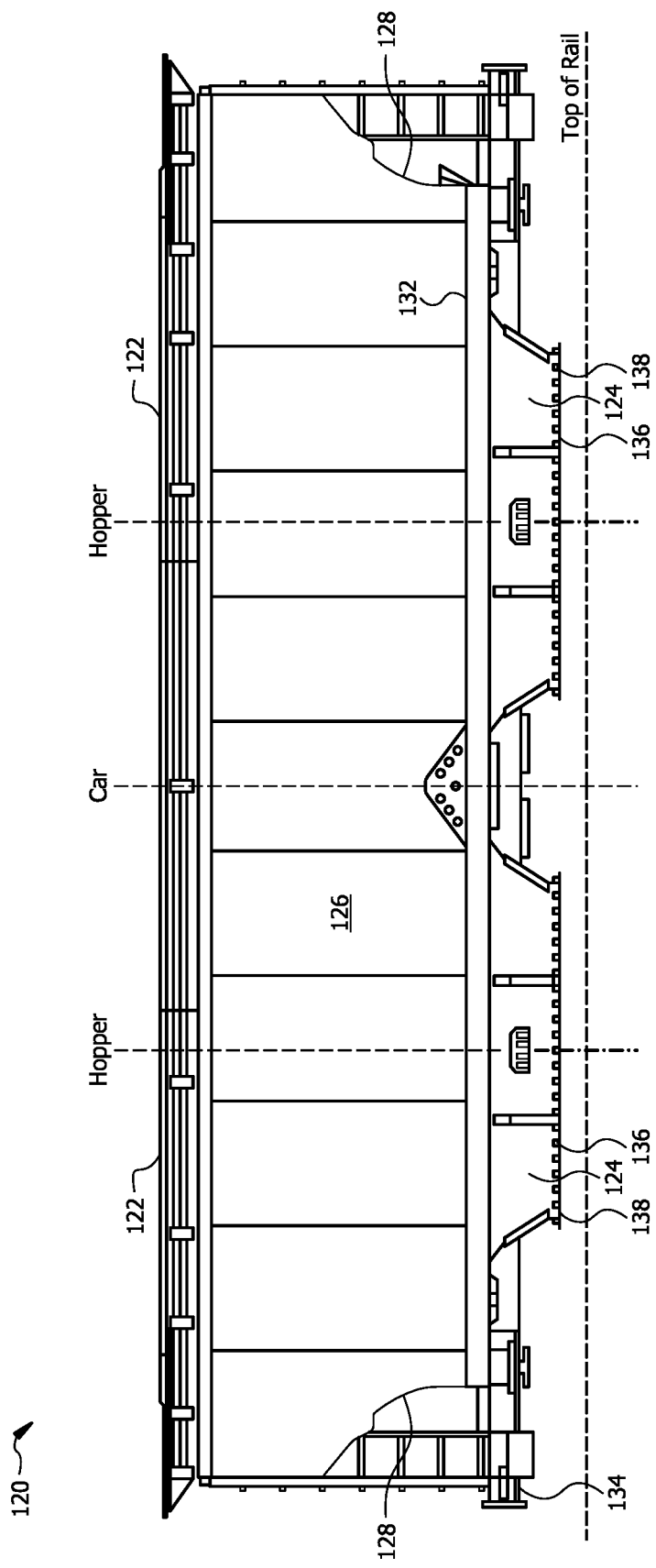
FIG. 1 illustrates a front view of an embodiment of a hopper car.

FIG. 1 illustrates an exemplary hopper car 120. Hopper car 120 may carry bulk materials such as coal and other types of lading or commodity. Examples of such commodity may include sand, metal ores, aggregate, grain, ballast, etc.

Hopper car 120 may be generally described as a covered hopper car. However, other embodiments may include open hopper cars or any other cars (e.g., gondola cars) suitable for carrying bulk commodity. The hopper car 120 includes containers for transporting its commodity, such as hoppers 122 with bottom discharge assemblies 124. Discharge assemblies 124 may be opened and closed to control the discharge of commodity from hoppers 122.

Each discharge assembly 124 comprises a discharge gate 136 and a seal assembly 138. The discharge gate 136 provides a discharge opening from which the commodity can be discharged when the discharge gate 136 is open. For example, when discharge gate 136 is open, the commodity can flow through the discharge opening using gravity. The seal assembly 138 is configured to seal the discharge gate 136 so that the commodity remains in the hopper 122 when the discharge gate 136 is closed. The discharge gate 136 is described in more detail in FIG. 2. The seal assembly 138 is described in more detail in FIGS. 3A-7.

In the illustrated embodiment, the hopper car 120 includes two hoppers 122. Particular embodiments of the hopper car 120 may include one, two, three, or any suitable number of hoppers 122. Particular embodiments may include other containers for transporting commodities, with or without discharge assemblies.

In particular embodiments, the hopper 122 is configured to carry bulk materials and the interior walls of hopper 122 are generally sloped towards discharge assembly 124 to facilitate discharge of the commodity. Multiple hoppers 122 may be separated by interior bulkheads.

In particular embodiments, the hopper car 120 may include a pair of sidewall assemblies 126 and sloped end wall assemblies 128 mounted on a railway car underframe. The railway car underframe includes center sill 134 and a pair of sill plates 132. The pair of sill plates 132 provides support for sidewall assemblies 126.

Center sill 134 may extend along a longitudinal centerline of hopper car 120 and is a structural element for carrying the loads of the hopper car. In some embodiments, the hopper car may be a stub sill design. Center sill 134 transfers the various longitudinal forces encountered during train operation from car to car.

Figure 2:
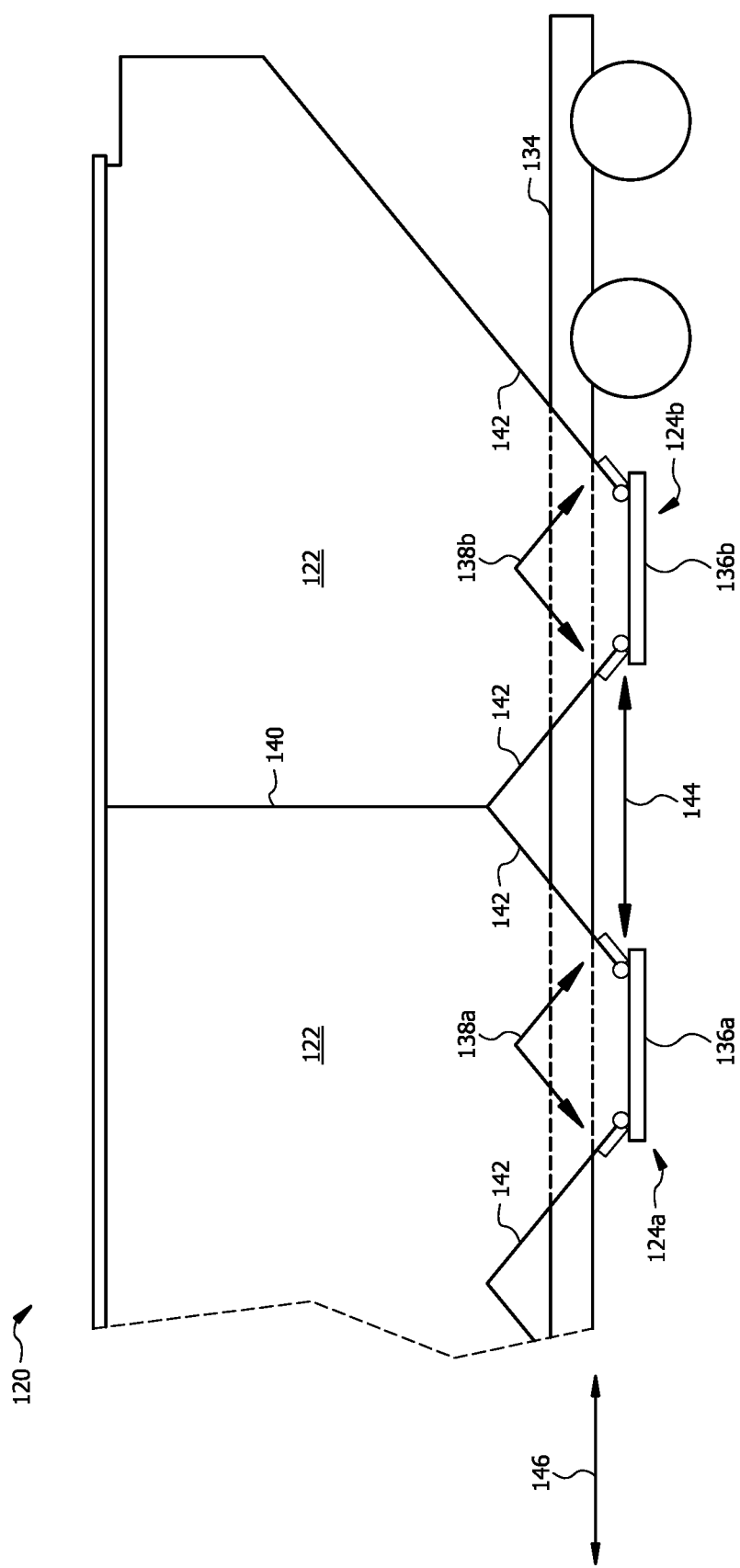
FIG. 2 illustrates a side view of an embodiment of a discharge assembly.

FIG. 2 illustrates a side view of an embodiment of discharge assemblies 124 in a hopper car 120. In the example of FIG. 2, two hoppers 122 with discharge assemblies 124a and 124b are shown. The hoppers 122 are separated by a wall 140. The sloping interior of the wall 140 form a ridge. The ridge comprises two sloping edges 142 between adjacent discharge gates 136a and 136b. Distance 144 is the distance between adjacent discharge gates 136a and 136b. The ridge is widest at its bottom-most portion (i.e., distance 144). The two sloping edges 142 extend upward where they join together, forming the ridge.

The discharge gates 136 are operable to slide in the longitudinal direction of hopper car 120 (shown by arrow 146) to discharge the commodity of hoppers 122 through the discharge gates 136. The discharge gates 136 are arranged in a horizontal plane and they slide horizontally along the longitudinal axis of hopper car 120. The dimensions of discharge gates 136 depend on the length and height of hopper car 120 and each hopper 122. In some examples, the discharge gates 136 may be four or five feet wide or any other suitable width that would be appreciated by one of ordinary skill in the art.

Each seal assembly 138 is coupled to its adjacent sloped hopper sheet 142. Each seal assembly 138 is generally configured to create a seal between a discharge gate 136 and sloped hopper sheet 142 when the discharge gate 136 is closed. Each seal assembly 138 prevents loss of commodity from the closed discharge gate 136, and further prevents unwanted particles or materials entering the hopper 122 from outside, such as dust and water.

In particular embodiments, a seal assembly 138 can be coupled to the above surface of its adjacent sloped hopper sheet 142. For example, as illustrated in FIG. 2, each of the seal assemblies 138a is coupled to the above surface of its adjacent sloped hopper sheet 142. This configuration is described in more detail in FIGS. 5A and 5B.

In particular embodiments, a seal assembly 138 can be coupled to the underside or underneath its adjacent sloped hopper sheet 142. For example, as further illustrated in FIG. 2, each of the seal assemblies 138b is coupled to the underneath of its adjacent sloped hopper sheet 142. This configuration is described in more detail in FIGS. 6A and 6B.

In particular embodiments, in a discharge gate 136, two seal assemblies 138 may be coupled to one sloped hopper sheet 142, where a first seal assembly 138 is coupled to the above surface of the sloped hopper sheet 142, and a second seal assembly 138 is coupled to the underneath of the sloped hopper sheet 142. This configuration is described in more detail in FIG. 7.

In particular embodiments, in a discharge gate 136, one seal assembly 138 (e.g., the left-side seal assembly 138) can be coupled to the above surface of its adjacent sloped hopper sheet 142, and another seal assembly 138 (e.g., the right-side seal assembly 138) can be coupled to the underneath of its adjacent sloped hopper sheet 142.

Figure 3A:
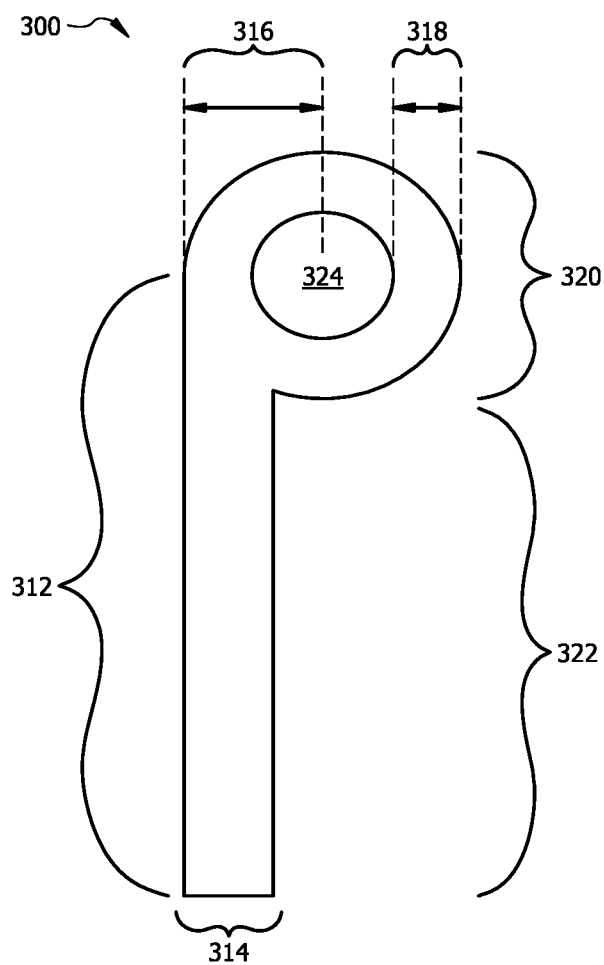
FIGS. 3A and 3B illustrate a cross-section and an isometric view of an embodiment of a seal gasket, respectively.
Figure 3B:
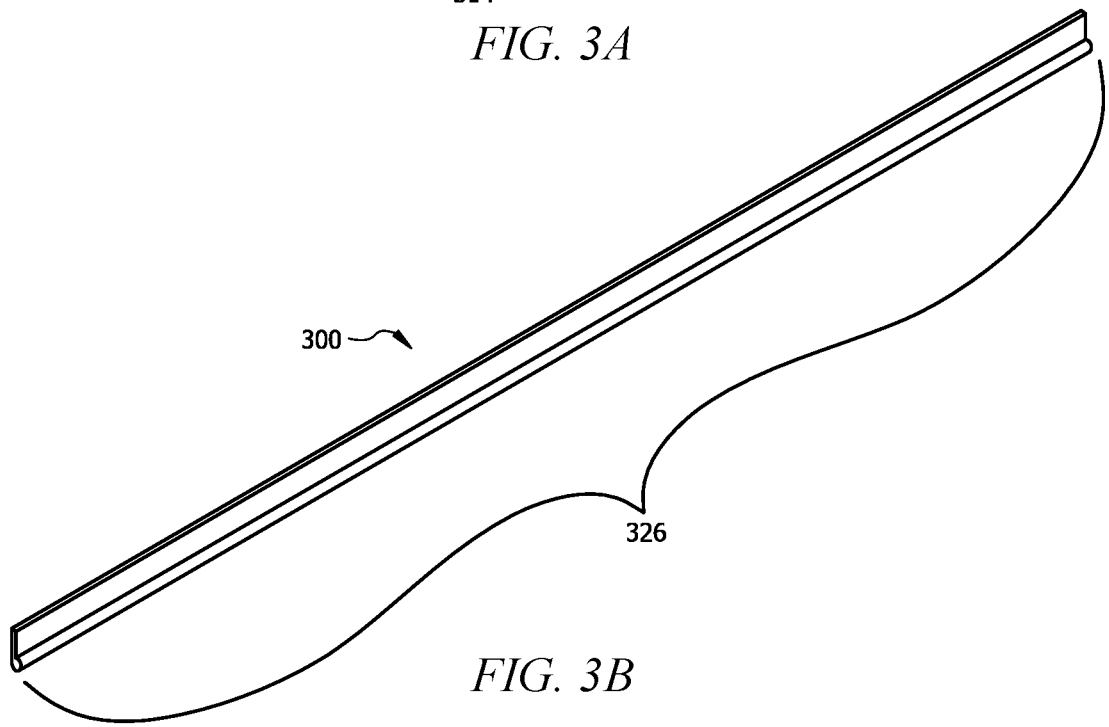
Figure 4A:
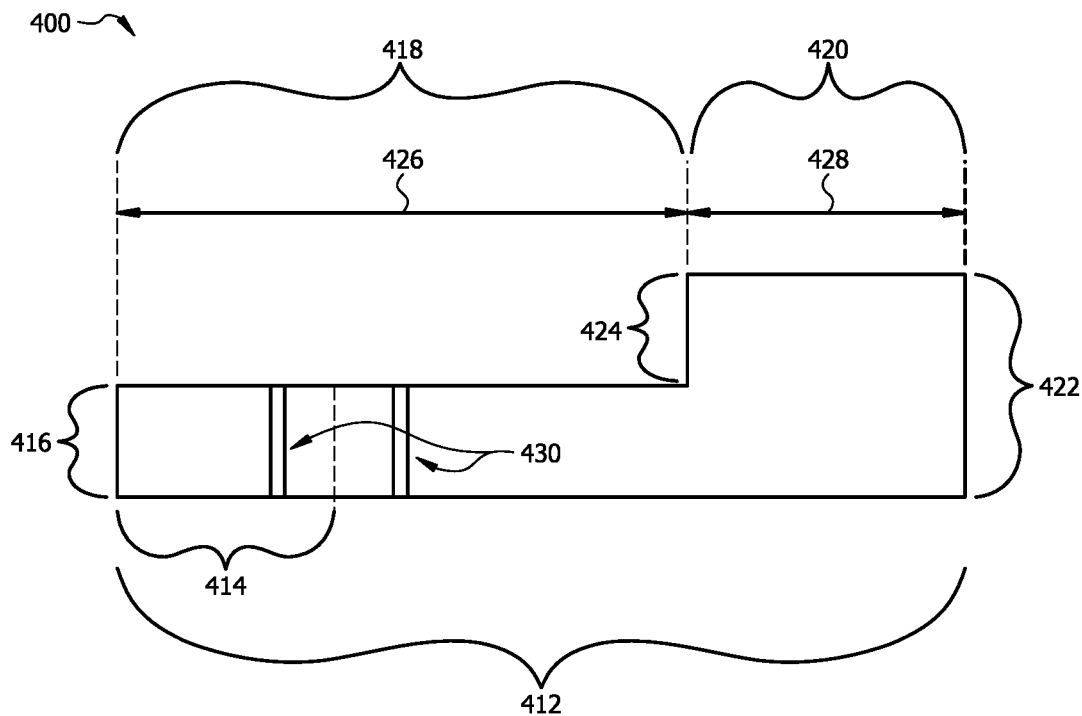
FIGS. 4A and 4B illustrate a cross-section and an isometric view of an embodiment of a gasket bracket, respectively.
Figure 4B:
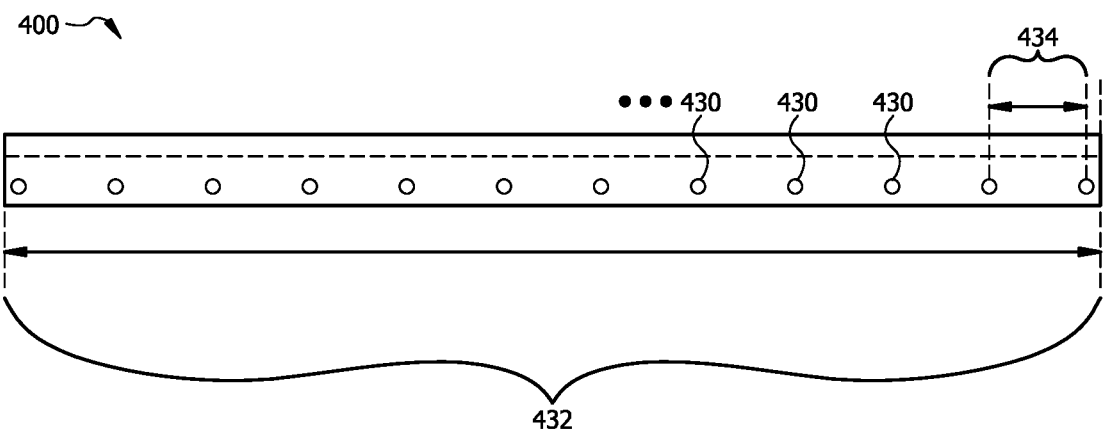

Each seal assembly 138 may comprise a seal gasket 300 (described in FIGS. 3A and 3B) and a gasket bracket 400 (described in FIGS. 4A and 4B). The dimension and materials used to form the seal assembly 138 (i.e., dimensions and materials used to form seal gasket 300 and gasket bracket 400) may vary depending on one or more dimensions (e.g., widths and lengths) of the discharge gate 136, the distance 144 between adjacent discharge gates 136, and a type of commodity carried by the hoppers 122, such that the seal assembly 138 provides a seal that is required to keep the commodity from escaping from the discharge gate 136 when the discharge gate 136 is closed.

FIG. 3A illustrates a cross-section of an embodiment of seal gasket 300. In particular embodiments, the seal gasket 300 may have a rounded section 320 and a straight section 322. In the illustrated embodiment of FIG. 3A, the seal gasket 300 has a p-shaped cross-section. In other embodiments, the seal gasket 300 may have a T-shaped cross-section, L-shaped cross-section, h-shaped cross-section, or any other form of cross-section that would be appreciated by one of ordinary skill in the art.

Seal gasket 300 may be formed by any sealant material including, but not limited to, silicon-based materials, plastic-based materials, or any other material that would be appreciated by one of ordinary skill in the art. In particular embodiments, the seal gasket 300 may comprise a wiper-type seal that includes wiper blades. In particular embodiments, the seal gasket 300 may comprise a brush-type seal.

As illustrated, seal gasket 300 comprises a rounded portion 320 and a straight portion 322. In the illustrated example, the rounded portion 320 is cylinder-shaped that comprises a hollow interior 324. The interior 324 may be left hollow or filled with a material. In one example, the interior 324 may be filled with a foam-based material. In other examples, the interior 324 may be filled with any suitable material that would be appreciated by one of ordinary skill in the art, including, but not limited to, a rubber-based material, a silicon-based material, and a plastic-based material. In one example, the interior 324 may be filled with a material that is more flexible than the material used in forming the seal assembly 138. In another example, the interior 324 may be filled with a material that is less flexible than the material used in forming the seal assembly 138.

In particular embodiments, the interior 324 may be enclosed, semi-enclosed, or not enclosed. In particular embodiments, the rounded portion 320 may be a solid cylinder-shaped structure without the interior 324.

As illustrated in FIG. 3A, the rounded portion 320 has a radius 316. The radius 316 may have any suitable length, such as a length between 0.5 to 4 inches. The material of the seal gasket 300 that forms the cylinder shape and wraps around the interior 324 has a width 318. The width 318 may be any suitable value, such as a value between 0.5 to 4 inches.

In the illustrated example, the straight portion 322 is rectangular prism-shaped with a length 312 and width 314. The straight portion 322 may have any suitable dimension (i.e., length 312 and width 314) that could be positioned on the sloped hopper sheet 142. For example, the length 312 may be any value between 0.5 to 8 inches. The width 314 may be any value between 0.2 to 4 inches.

FIG. 3B illustrates an isometric view of an embodiment of seal gasket 300. As illustrated, the seal gasket 300 has a length 326. The length 326 of the seal gasket 300 is substantially equal to the length of discharge gate 136 (see FIG. 2).

FIG. 4A illustrates a cross-section of an embodiment of the gasket bracket 400. The gasket bracket 400 is coupled to the sloped hopper sheet 142, and is generally configured to secure the seal gasket 300 (see FIG. 3) to the sloped hopper sheet 142 (see FIG. 2) such that the seal gasket 300 is secured between the gasket bracket 400 and sloped hopper sheet 142 (see FIG. 2).

Gasket bracket 400 may be formed by any material that can be used to secure the seal gasket 300 (see FIG. 3) to sloped hopper sheet 142 (see FIG. 2). For example, the gasket bracket 400 may be formed by steel or other metal alloy plates. The gasket bracket 400 has a length 412. The length 412 may be any suitable value, such as a value between 1 to 5 inches.

As illustrated, the gasket bracket 400 comprises a first portion 418 and a second portion 420. The first portion 418 has a length 426. In some embodiments and as illustrated, the first portion 418 is longer than the second portion 420. The length 426 may be any value, for example, a value between 0.5 to 4 inches. The second portion 420 has a length 428. The length 428 may be any value, for example, a value between 0.5 to 4 inches.

The first portion 418 has a first width 416. The second portion 420 has a second width 422. The first width 416 is smaller than the second width 422 by a width 424, i.e., the addition of the first width 416 with width 424 corresponds to the width 422. For example, the first width 416 may be any value between 0.2 to 3 inches, and the second width 422 may be any value between 0.3 to 4 inches.

The gasket bracket 400 is coupled to a sloped hopper sheet 412 (see FIG. 2) by any suitable method, such as bolting, welding, and the like. In the illustrated example, holes 430 are made in the gasket bracket 430 for bolting the gasket bracket 400 to the sloped hopper sheet 412 (see FIG. 2). Although in FIG. 4A, two holes 430 are shown, any number of holes 430 along the length 412 may be formed.

FIG. 4B illustrates a top view of an embodiment of gasket bracket 400. The gasket bracket 400 has a length 432. The length 432 of the gasket bracket 400 is substantially equal to the length of discharge gate 136 (see FIG. 2). Adjacent holes 430 are formed with a distance 434 separating them. The distance 434 may be any suitable distance, for example, between 1 to 8 inches. Any number of holes 430 may be formed along the length 432 depending on the length 432.

Figure 5A:
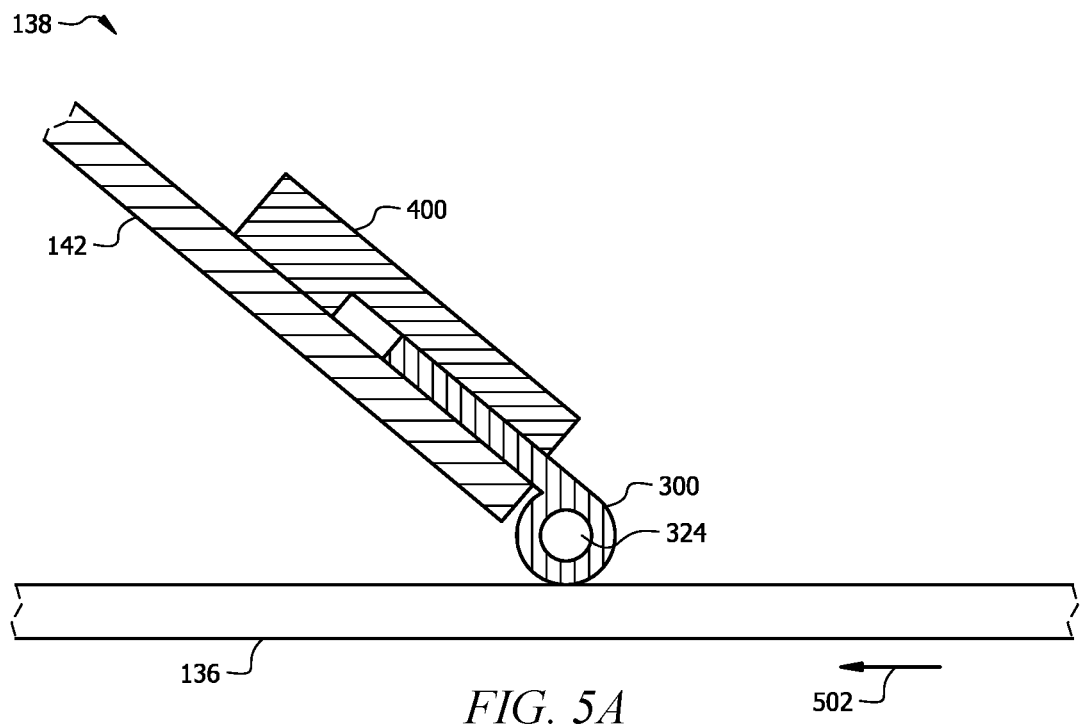
FIGS. 5A and 5B illustrate a cross-section and an isometric view of an embodiment of a first configuration of a seal assembly, respectively.
Figure 5B:
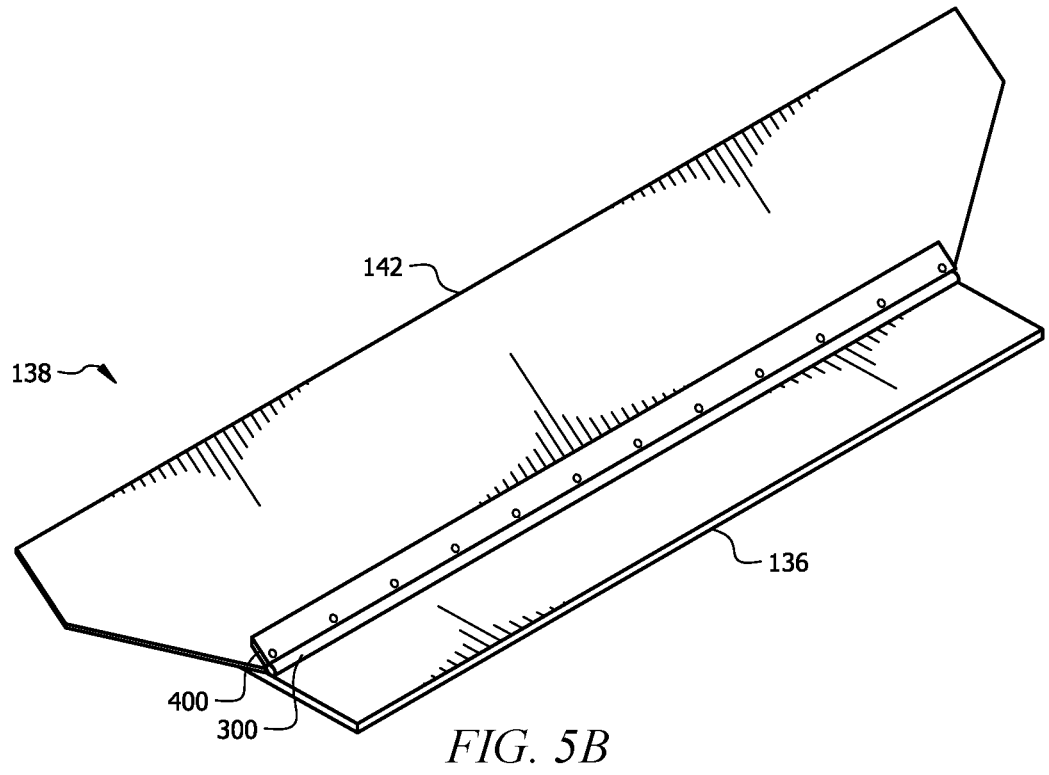

FIG. 5A illustrates a cross-section of a first configuration of the seal assembly 138. FIG. 5B illustrates an isometric view of the first configuration of the seal assembly 138. In FIGS. 5A and 5B, the discharge gate 136 is in the closed position. The discharge gate 136 can be opened by moving the discharge gate 136 to the left, shown by direction 502. The commodity sits on top of the discharge gate 136, seal assembly 138, and the sloped hopper sheet 142. The commodity can flow through the discharge gate 136 when the discharge gate 136 is opened.

In the first configuration of the seal assembly 138, the gasket bracket 400 is mounted on top of the sloped hopper sheet 142, and the gasket seal 300 is positioned between the gasket bracket 400 and the sloped hopper sheet 142 such that a portion of the round portion of the p-shaped gasket seal 300 is left beyond the bottom of the sloped hopper sheet 142.

In the first configuration of the seal assembly 138, the gasket bracket 400 is coupled to the interior surface of the hopper 122 (see FIG. 2). Furthermore, in the first configuration of the seal assembly 138, the round-shaped portion of the seal gasket 300 is facing down or away from the hopper 122 (see FIG. 2). In particular embodiments, the seal gasket 300 may be facing up or toward the hopper 122.

The seal gasket 300 creates a seal between the sloped hopper sheet 142 and the discharge gate 136. Since the commodity sits on top of the discharge gate 136 and sloped hopper sheet 142, the weight of the commodity pushes down on the round-shaped portion of the seal gasket 300, which strengthens and increases the seal between the sloped hopper sheet 142 and the discharge gate 136.

As can be seen in FIG. 5B, the seal assembly 138 longitudinally extends along the length of the discharge gate 136. The length of the seal assembly 138 is substantially equal to the length of discharge gate 136.

Figure 6A:
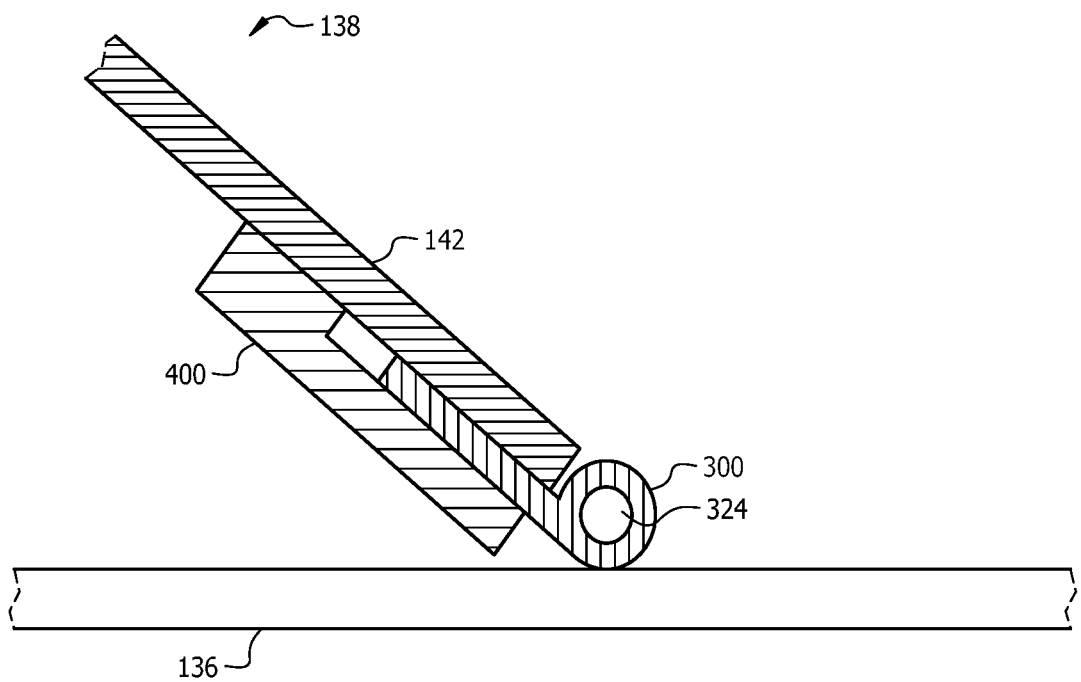
FIGS. 6A and 6B illustrate a cross-section and an isometric view of an embodiment of a second configuration of a seal assembly, respectively.
Figure 6B:
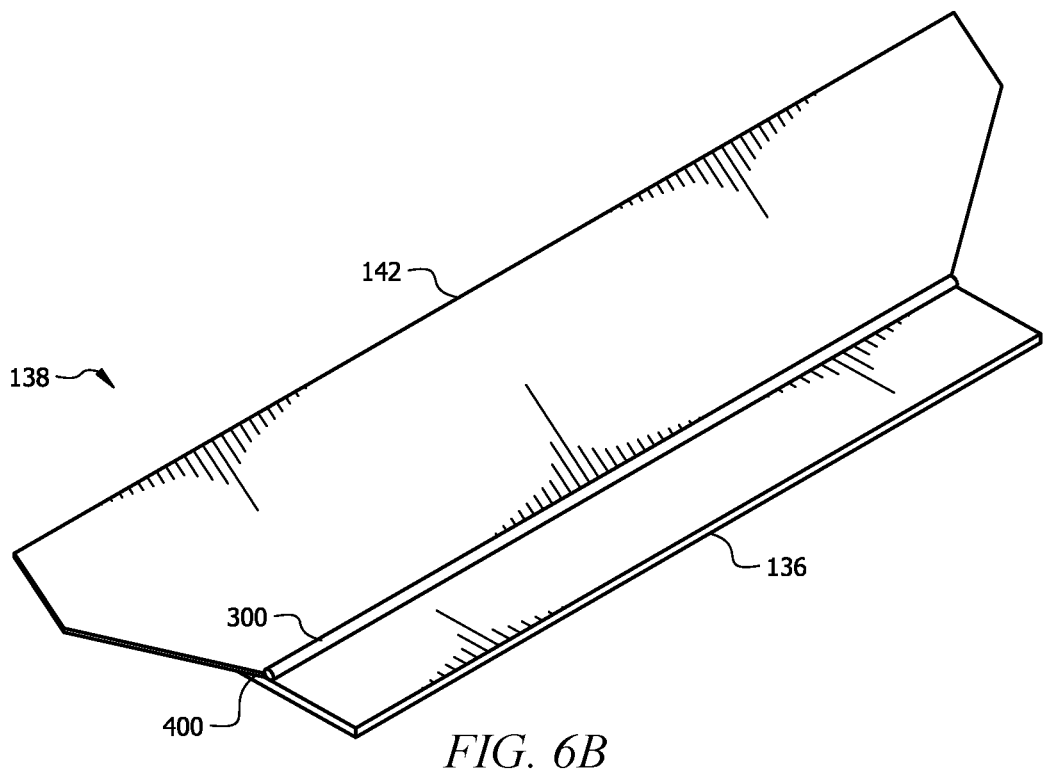

FIG. 6A illustrates a cross-section of a second configuration of the seal assembly 138. FIG. 6B illustrates an isometric view of the second configuration of the seal assembly 138. Similar to FIGS. 5A and 5B, in FIGS. 6A and 6B, the discharge gate 136 is in the closed position.

In the second configuration of the seal assembly 138, the gasket bracket 400 is mounted to the underneath surface of the sloped hopper sheet 142, and the gasket seal 300 is positioned between the gasket bracket 400 and the sloped hopper sheet 142 such that the round portion of the p-shaped gasket seal 300 is left beyond the bottom of the sloped hopper sheet 142. In the second configuration of the seal assembly 138, the gasket bracket 400 is coupled to the exterior surface of the hopper 122 (see FIG. 2).

Furthermore, in the second configuration of seal assembly 138, the round-shaped portion of the seal gasket 300 is facing up or toward the hopper 122 (see FIG. 2). In particular embodiments, the round-shaped portion of the seal gasket 300 may be facing down or away from the hopper 122.

Similar to that described in FIGS. 5A and 5B, the commodity sits on top of the sloped hopper sheet 142, the discharge gate 136, and the seal assembly 138. Thus, the weight of the commodity compresses down the round-shaped portion of the seal gasket 300, which strengthens and increases the seal between the sloped hopper sheet 142 and discharge gate 136.

Since in the second configuration of seal assembly 138 the gasket bracket 400 is mounted underneath the sloped hopper sheet 142, the top side of the sloped hopper sheet 142 provides an obstacle-free surface. As such, the second configuration of seal assembly 138 provides an advantage of commodity sliding down on the obstacle-free surface of the sloped hopper sheet 142. Thus, the second configuration of seal assembly 138 may be used in hoppers 122 carrying commodities that may be physically small (such as sugar, sand, small grain, and the like) such that they would otherwise be stuck above the gasket bracket 400 if the gasket bracket 400 was mounted on top of the sloped hopper sheet 122.

As can be seen in FIG. 6B, the seal assembly 138 longitudinally extends along the length of the discharge gate 136. The length of the seal assembly 138 is substantially equal to the length of discharge gate 136.

Figure 7:
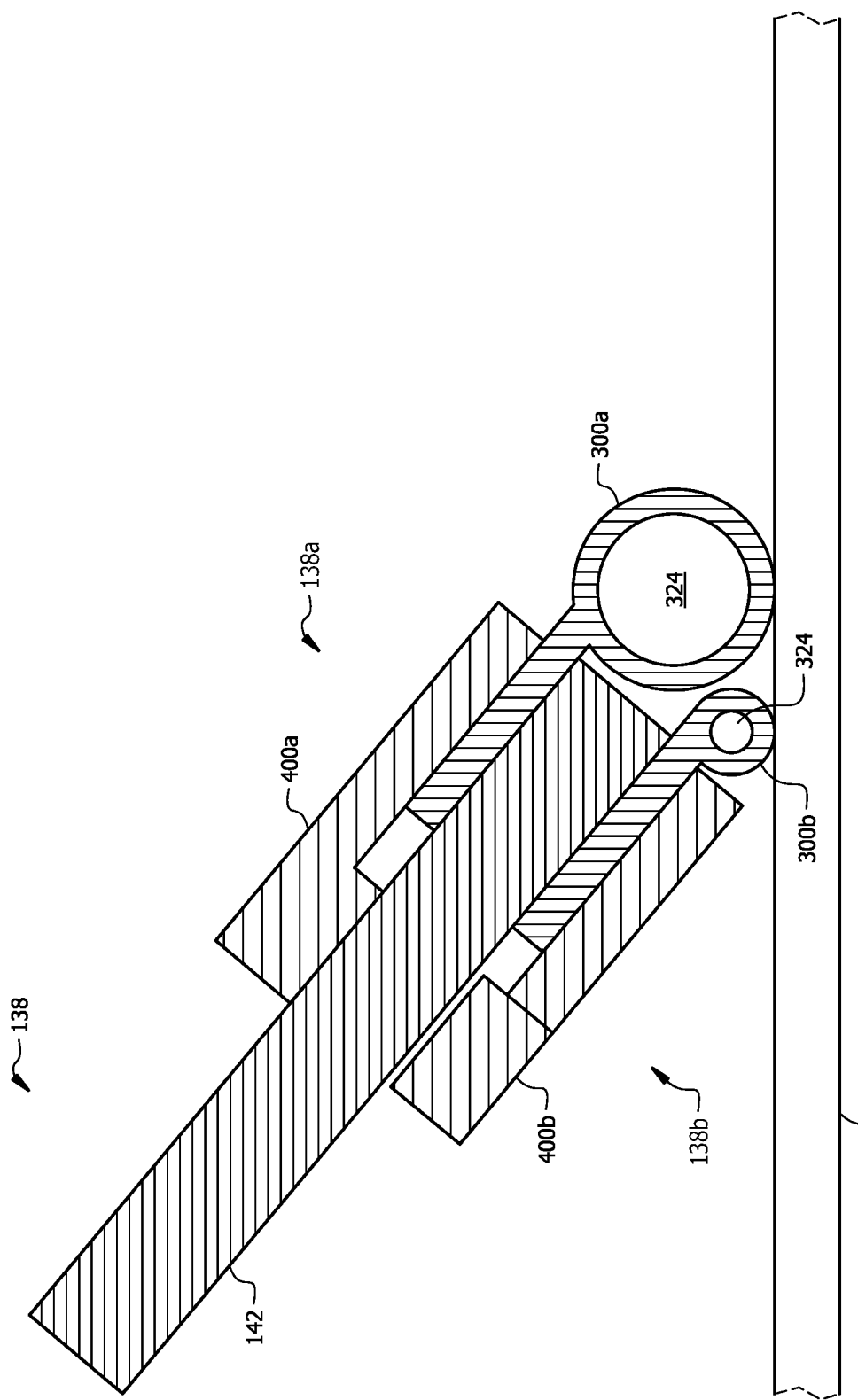
FIG. 7 illustrates a cross-section of an embodiment of a third configuration of a seal assembly.

FIG. 7 illustrates a cross-section of a third configuration of the seal assembly 138. In one embodiment, the third configuration of the seal assembly 138 may be a combination of the first configuration of the seal assembly 138 (described in FIGS. 5A and 5B) and the second configuration of the seal assembly 138 (described in FIGS. 6A and 6B).

For example, the third configuration of seal assembly 138 may comprise a first seal assembly 138a mounted on top of the sloped hopper sheet 142, and a second seal assembly 138b mounted to the underneath surface of the sloped hopper sheet 142. In the first seal assembly 138a, the first gasket bracket 400a is mounted on top of the sloped hopper sheet 142, and a first seal gasket 300a positioned between the first gasket bracket 400a and the sloped hopper sheet 142. In the second seal assembly 138b, the second gasket bracket 400b is mounted to the underneath surface of the sloped hopper sheet 142, and a second seal gasket 300b is positioned between the second gasket bracket 400b and the sloped hopper sheet 142.

In any of the first, second, and third configurations of seal assembly 138 described in FIGS. 5A to 7, the interior 324 may be left empty or filled with a material. In one example, to increase tension or seal between the sloped hopper sheet 142 and discharge gate 136, the interior 324 may be filled with a rigid or semi-rigid material, and the seal assembly 138 may be formed by a flexible material. In particular embodiments, the interior 324 may be filled with a mesh of streel-based material.

In some cases, a rounded section 320 (see FIG. 3) of a seal gasket 300 can vary in various embodiments as illustrated in FIG. 7, for example, to allow the seal gasket 300 to contact the discharge gate 136. As can be seen in FIG. 7, the size of the rounded section 320 of the seal gasket 300a is adjusted to allow the seal gasket 300a to contact the discharge gate 136.

In some cases, the discharge gate 136 may have a rough surface that may cause damage or wear on the seal assembly 138. As such, to reduce the damage on the seal assembly 138, the interior 324 may be filled with a flexible material, and the seal assembly 138 may be formed by a rigid or semi-rigid material.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A railcar comprising:
   a hopper;
   a discharge assembly coupled to the hopper, the discharge assembly comprising:
      a discharge gate operable to move from a closed position that restricts a lading from discharging through the discharge gate to an open position that permits the lading to discharge through the discharge gate;
      a first sloped side sheet longitudinally extending above the discharge gate when the discharge gate is closed;
      a first gasket bracket coupled to the first sloped side sheet, wherein the first gasket bracket extends longitudinally along a bottom end of the first sloped side sheet; and
      a first seal gasket positioned between the first sloped side sheet and the first gasket bracket, the first seal gasket having a straight section and a rounded section; wherein:
         the first gasket bracket is mounted on top of the first sloped side sheet;
         the first seal gasket is positioned above the first sloped side sheet and underneath the first gasket bracket, such that a portion of the rounded section of the first seal gasket is left beyond the bottom end of the first sloped side sheet and the bottom end of the first gasket bracket, and
         the first seal gasket creates a seal between the first sloped side sheet and the discharge gate such that a weight of the lading increases the seal.

2. The railcar of claim 1, wherein the straight section and the rounded section of the first seal gasket combine to form a p-shaped cross section.

3. The railcar of claim 2, wherein:
   the top portion in the p-shaped cross-section of the first seal gasket has a cylinder-shaped space, and
   the cylinder-shaped space is filled with a material comprising a foam-based material.

4. The railcar of claim 1, wherein the discharge assembly further comprises:

a second gasket bracket coupled to the first sloped side sheet, wherein the second gasket bracket extends longitudinally along the bottom end of the first sloped side sheet;
a second seal gasket positioned between the first sloped side sheet and the second gasket bracket, the second seal gasket having a straight section and a rounded section; wherein:
the second gasket bracket is mounted underneath the first sloped side sheet;
the second seal gasket is positioned underneath the first sloped side sheet and above the first gasket bracket, such that a portion of the rounded section of the second seal gasket is left beyond the bottom end of the first sloped side sheet, and
the second seal gasket creates a second seal between the first sloped side sheet and the discharge gate.

5. The railcar of claim 4, wherein:
the first seal gasket is positioned such that the top portion in the p-shaped cross-section of the first seal gasket is facing away from the hopper; and
the second seal gasket is positioned such that the top portion in the p-shaped cross-section of the second seal gasket is facing toward the hopper.

6. The railcar of claim 4, wherein the first gasket bracket is shaped with a first width at the top portion and a second width at a bottom portion, and the first width is larger than the second width.

7. The railcar of claim 1, wherein the first seal gasket is formed by at least one of a silicon-based material and a plastic-based material.

8. The railcar of claim 1, wherein the discharge assembly further comprises:
a second sloped side sheet longitudinally extending above the discharge gate when the discharge gate is closed;
a third gasket bracket coupled to the second sloped side sheet, wherein the third gasket bracket extends longitudinally along a bottom end of the second sloped side sheet;
a third seal gasket positioned between the second sloped side sheet and the third gasket bracket, the third seal gasket having a straight section and a rounded section, wherein:
the third gasket bracket is underneath the second sloped side sheet;
the third seal gasket is positioned underneath the second sloped side sheet and above the third gasket bracket, such that a portion of the rounded section of the third seal gasket is left beyond the bottom end of the second sloped side sheet, and
the third seal gasket creates a third seal between the second sloped side sheet and the discharge gate.

9. The railcar of claim 8, wherein the rounded section of the third seal gasket is filled with a mesh of steel-based material, wherein the rounded section of the third seal gasket is enclosed.

10. The railcar of claim 8, wherein the rounded section of the third seal gasket is semi-enclosed.

11. A discharge assembly for a railcar comprising:
a discharge gate operable to move from a closed position that restricts a lading from discharging through the discharge gate to an open position that permits the lading to discharge through the discharge gate;
a first sloped side sheet longitudinally extending above the discharge gate when the discharge gate is closed;

a first gasket bracket coupled to the first sloped side sheet, wherein the first gasket bracket extends longitudinally along a bottom end of the first sloped side sheet; and
a first seal gasket positioned between the first sloped side sheet and the first gasket bracket, the first seal gasket having a straight section and a rounded section; wherein:
the first gasket bracket is mounted on top of the first sloped side sheet;
the first seal gasket is positioned above the first sloped side sheet and underneath
the first gasket bracket, such that a portion of the rounded section of the first seal gasket is left beyond the bottom end of the first sloped side sheet and the bottom end of the first gasket bracket, and
the first seal gasket creates a seal between the first sloped side sheet and the discharge gate such that a weight of the lading increases the seal.

12. The discharge assembly of claim 11, wherein the straight section and the rounded section of the first seal gasket combine to form a p-shaped cross section.

13. The discharge assembly of claim 12, wherein:
the top portion in the p-shaped cross-section of the first seal gasket has a cylinder-shaped space, and
the cylinder-shaped space is filled with a material comprising a foam-based material.

14. The discharge assembly of claim 11, wherein the discharge assembly further comprises:
a second gasket bracket coupled to the first sloped side sheet, wherein the second gasket bracket extends longitudinally along the bottom end of the first sloped side sheet;
a second seal gasket positioned between the first sloped side sheet and the second gasket bracket, the second seal gasket having a straight section and a rounded section; wherein:
the second gasket bracket is mounted underneath the first sloped side sheet;
the second seal gasket is positioned underneath the first sloped side sheet and above the first gasket bracket, such that a portion of the rounded section of the second seal gasket is left beyond the bottom end of the first sloped side sheet, and
the second seal gasket creates a second seal between the first sloped side sheet and the discharge gate.

15. The discharge assembly of claim 14, wherein:
the first seal gasket is positioned such that the top portion in the p-shaped cross-section of the first seal gasket is facing away from a hopper of the railcar; and
the second seal gasket is positioned such that the top portion in the p-shaped cross-section of the second seal gasket is facing toward the hopper.

16. The discharge assembly of claim 14, wherein the first gasket bracket is shaped with a first width at the top portion and a second width at a bottom portion, and the first width is larger than the second width.

17. The discharge assembly of claim 11, wherein the first seal gasket is formed by at least one of a silicon-based material and a plastic-based material.

18. The discharge assembly of claim 11, wherein the discharge assembly further comprises:
a second sloped side sheet longitudinally extending above the discharge gate when the discharge gate is closed;
a third gasket bracket coupled to the second sloped side sheet, wherein the third gasket bracket extends longitudinally along a bottom end of the second sloped side sheet;

a third seal gasket positioned between the second sloped side sheet and the third gasket bracket, the third seal gasket having a straight section and a rounded section, wherein:

the third gasket bracket is underneath the second sloped side sheet;

the third seal gasket is positioned underneath the second sloped side sheet and above the third gasket bracket, such that a portion of the rounded section of the third seal gasket is left beyond the bottom end of the second sloped side sheet, and the third seal gasket creates a third seal between the second sloped side sheet and the discharge gate.

19. The discharge assembly of claim 18, wherein the rounded section of the third seal gasket is filled with a mesh of steel-based material, wherein the rounded section of the third seal gasket is enclosed.

20. The discharge assembly of claim 18, wherein the rounded section of the third seal gasket is semi-enclosed.

\* \* \* \* \*